Patented Sept. 19, 1933

1,927,737

UNITED STATES PATENT OFFICE 1,927,737

METHOD FOR THE MANUFACTURE OF ACID RESISTANT FLUXES FOR ENAMEL COLORS

Hermann Eisenlohr, Frankfort-on-the-Main, Germany

No Drawing. Application May 12, 1930, Serial No. 451,871, and in Germany May 21, 1929

7 Claims. (Cl. 106—36.2)

The object of this invention is the production of vitrifiable enamel colors, and more especially to the production of those colors which will give, when fused to objects such as ceramic articles and metals, a surface or glaze which is highly resistant to acid.

In the known method of making acid resistant vitrifiable colors, comparatively large quantities of silica and silicates are used in the flux. Because of the high melting point of the silica compounds, it has been customary to add certain quantities of boric acid in order to lower the melting point of the flux. However, these additions of boric acid lower the acid resisting properties of the fused product. An additional disadvantage of the known acid resisting vitrifiable colors is that they possess less gloss and brilliance of appearance than those colors which are considered as non-acid resistant.

It has now been found that vitrified colors of high acid resistance and having a brilliant gloss may be produced by the addition of a lithium compound to a silicate flux.

The lithium is added either in the form of a silicate or as a substance which will be converted to the silicate when the flux mixture is melted. Lithium silicate, for example, can be prepared by fusing together lithium carbonate and silicic acid (silica) and this product can then be fused with other fluxing ingredients, such as red lead, in any proportions desired. The ingredients which react to form lithium silicate, such as lithium carbonate and silica, may be mixed before fusing with the other constituents of the flux, such as red lead, and this mixture then fused together. Satisfactory fluxes have been made from red lead, lithium oxide, and silica. However, the fluxes of this invention may contain other components, such as potassium oxide, potassium silicate and the like.

Advantageously the highly acid resistant fluxes of this invention which are also of comparatively low fusibility, are prepared by utilizing a eutectic of lithium oxide and silica, or this eutectic in conjunction with other fluxing materials in the necessary proportions. For example, a lithium oxide—silica eutectic may be obtained by fusing together 29.3 parts by weight of lithium carbonate and 88.1 parts of silica.

In preparing the acid resistant fluxes of this invention, a lithium silicate composition, such as the eutectic just described, is fused with a lead compound such as red lead. When using lithium and silica in the proportions in which they are present in the above described product, obtained by fusing together 29.3 parts of lithium carbonate and 88.1 parts of silicic acid, about 230 parts of red lead can be fused with about 120 to 240 parts by weight of the lithium silicate—silicic acid melt.

I prefer to use lead compounds in the proportion of 228 parts by weight of red lead or its equivalent with about 180 to 204 parts by weight of the lithium oxide—silicic acid eutectic described above, since the fluxes and the colors obtained therefrom are exceptionally acid resistant and give a very brilliant gloss to the vitrified colors. The eutectic silicate compositions can be prepared previous to its fusion with the lead compounds or it can be prepared by fusing its components in the presence of the lead compounds. They may contain for instance lithium oxide and silica in the following proportions:

88 parts by weight $SiO_2$ and 12 parts by weight $Li_2O$
80 parts by weight $SiO_2$ and 20 parts by weight $Li_2O$
58 parts by weight $SiO_2$ and 42 parts by weight $Li_2O$ In addition to lead, silica and lithium, the fluxes can contain other constituents. For example, a satisfactory flux containing potassium has been prepared having the following composition in molecular percent:

0.9 $PbO$
0.05 $K_2O$ } 1.5 $SiO_2$
0.05 $Li_2O$

The final vitrifiable colors are obtained in the usual manner by mixing coloring bodies or oxides with the lithium fluxes described above and milling or fusing the mixture. 10 to 30 parts of pigments may be used with 100 parts of flux. The addition of the coloring matter has very little effect on the acid resisting properties of the flux.

A few examples will serve to illustrate my invention, as follows:

Example I

A reddish-brown pigment was first prepared by thoroughly mixing and then calcining 30.4 to 106.5 parts by weight of chromic oxide, 128 to 148 parts of iron oxide and 81 to 162 parts by weight of zinc oxide. 20 parts of this pigment were thoroughly ground up with 100 parts of a flux which was obtained by fusing together 228 parts by weight of red lead, 60 parts of lithium carbonate, and 180 parts by weight of silica.

Example II 228 parts by weight of red lead were mixed and fused with 204 parts by weight of lithium silicate which was obtained by melting together 88 parts by weight of silica and 30 parts of lithium carbonate. 100 parts of this flux were then ground up with 20 parts of reddish-brown pigment obtained in Example I.

The vitrifiable colors obtained by this invention are characterized by an exceptionally glossy appearance and great purity of color tone. The vitrifiable colors have a high silica content and are more resistant to acids than the known colors having the same silica content. This invention eliminates the use of boric acid which was previously used to lower the melting point of a flux or color having a relatively high silica content and which not only lowered the melting point, but at the same time lowered the resistance of the flux or color to acid and diminished the gloss of the finish.

What I claim is:

1. A method for the manufacture of acid resistant fluxes for enamel colors which are free from boric acid which comprises fusing a lead compound with such proportions of a lithium compound and silica as to produce when fused a eutectic composition of lithium oxide and silica.

2. An acid resistant vitrifiable color which is free from boric acid comprising a fused mixture of an enamel pigment and a flux which contains lithium silicate and lead oxide.

3. An acid resistant vitrifiable color which is free from boric acid comprising a fused mixture of an enamel pigment and a flux which contains lead oxide and a eutectic composition of lithium oxide and silica, said eutectic composition consisting of lithium oxide and silica in the proportions in which they are obtained by fusing together about 30 parts by weight of lithium carbonate and 88 parts of silica.

4. An acid resistant vitrifiable color which is free from boric acid comprising a fused mixture of an enamel pigment and a flux comprising 228 parts of red lead and about 180 to 204 parts by weight of a lithium silicate composition.

5. An acid resistant vitrifiable color which is free from boric acid comprising a fused mixture of an enamel pigment and a flux consisting of 228 parts by weight of red lead and about 180 to 204 parts by weight of a lithium oxide silica eutectic composition obtained by fusing together about 30 parts of lithium carbonate and 88 parts of silica.

6. An acid resistant vitrifiable color which is free from boric acid comprising a fused mixture of about 20 parts of a calcined mixture of 30 to 106 parts by weight of chromic oxide, 128 to 148 parts of iron oxide and 81 to 162 parts of zinc oxide and 100 parts of a flux consisting of the fused mixture of 228 parts by weight of red lead, 60 parts by weight of lithium carbonate and 180 parts of silica.

7. An acid resistant flux for vitrifiable colors which is free from boric acid consisting of 228 parts by weight of red lead and about 180 to 204 parts by weight of a lithium oxide-silica eutectic composition in which the lithium oxide and silca are present in the proportion obtained when fusing together about 30 parts of lithium carbonate and 88 parts of silica.

HERMANN EISENLOHR.